March 29, 1966     W. E. ARNOLDI     3,242,651
PURIFICATION SYSTEM WITH EQUALIZING VALVE
Filed April 24, 1961     3 Sheets-Sheet 1

POSITION DIAGRAM OF VALVE 32

INVENTOR
WALTER E. ARNOLDI
BY Norman Friedland
AGENT

INVENTOR
WALTER E. ARNOLDI
BY Norman Friedland
AGENT

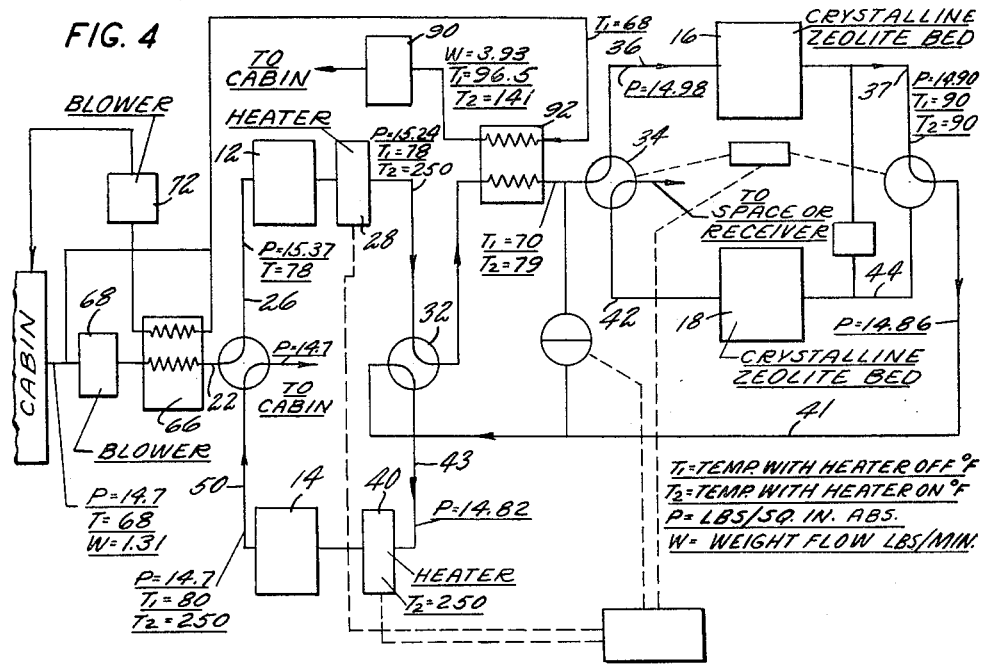
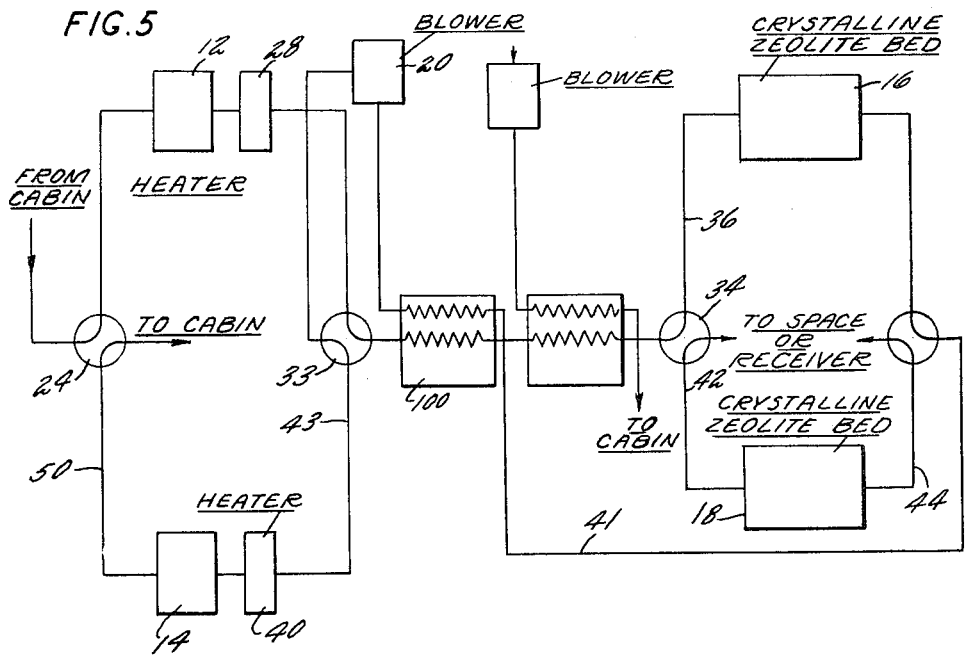

United States Patent Office 3,242,651
Patented Mar. 29, 1966

3,242,651
PURIFICATION SYSTEM WITH EQUALIZING
VALVE
Walter E. Arnoldi, West Hartford, Conn., assignor to
United Aircraft Corporation, East Hartford, Conn., a
corporation of Delaware
Filed Apr. 24, 1961, Ser. No. 104,892
3 Claims. (Cl. 55—179)

This invention relates to air purification systems and more particularly to carbon dioxide removal systems of the adsorption type adapted to be utilized for a closed compartment.

This invention constitutes an improvement over the carbon dioxide removal systems disclosed and claimed in U.S. application Serial No. 105,187 filed on April 24, 1961 and assigned to the same assignee.

It becomes of the utmost importance, particularly in manned space vehicles, to maintain the concentration of carbon dioxide in the atmosphere of the vehicle at a tolerably low level. In considering the design for such a device, extensive consideration must be given to the power requirements, expendable mass, fixed mass, mission time, heat rejection and overall weight and size. Each mission which the vehicle is intended to accomplish and size of the space vehicle will dictate the particular design considerations. Although the system may at times operate in an accelerated motion, it must be inherently able to operate in the absence of such motion and gravity forces. I have devised a suitable system that satisfactorily accomplishes the requirements necessary for a range of space flight missions.

It is an object of this invention to provide a valve that connects the interior of each of the crystalline zeolite beds partially to conserve the atmosphere which would otherwise be vented.

It still is an object of this invention to dispose a flow blower between the pair of moisture adsorbent beds and the pair of carbon dioxide adsorbent beds so that the rise in temperature of the air passing therethrough caused by said blower will be taken advantage of in the cyclic process.

Other features and advantages will be apparent from the specification and claims and the accompanying drawings which illustrate an embodiment of the invention.

FIG. 4 is another diagrammatic illustration of our invention and including an example of the temperature, pressure and flow characteristics of the fluid at various points throughout the system.

FIG. 5 is another schematic illustration of the invention.

In the interest of removing carbon dioxide by expending a small amount of power, it becomes a necessity to remove the moisture entrained in the atmosphere prior to removing the carbon dioxide from the atmosphere. As a practical solution to this problem, several physical adsorption devices are attractive because they lend themselves to being regenerated over repeated operations without substantially losing capacity to adsorb. Since the effectiveness to adsorb is different for the two types of adsorption beds, i.e. the moisture removal and carbon dioxide removal, this system provides different regenerating cycles for each type.

In this manner, the system is afforded a high degree of effectiveness for a small amount of power expended. Along the same vein, to conserve power, the heaters are also independently cycled so that the operation time will be limited to afford a maximum desorbing effect of the silica gel bed. Although the invention shows in its preferred embodiment electrical means for generating heat, other means may be employed without departing from the scope of this invention.

Figure 1:
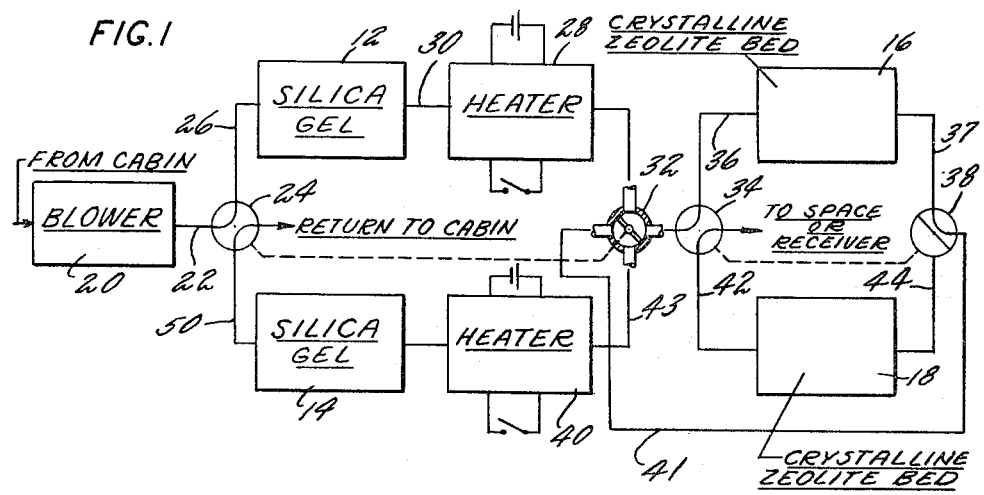
FIG. 1 is a diagrammatic illustration of the invention.

A preferred embodiment of a carbon dioxide removal system, which illustrates the present invention, is shown in FIG. 1 and comprises a pair of cyclically regenerative silica gel beds 12 and 14 and cyclically regenerative zeolite beds 16 and 18. As will become more apparent from the description to follow, when one of the silica gel beds is adsorbing, the other is desorbing and similarly when one of the crystalline zeolite beds is adsorbing, the other is desorbing. It is to be understood that in connection with the description to follow, the zeolite adsorbers may be vented to a receiver having a low pressure, such as an evacuated plenum chamber, or vented directly to space. Thus in a submarine application, for example, an evacuated plenum chamber may be utilized.

The silica gel bed is contained within a housing formed from a suitable corrosion resistant structural material. Likewise, the crystalline zeolite beds, known also by the trade names of Molecular Sieve or Microtrap, may be contained in a housing made from a suitable corrosion resistant structural material. A blower 20 may be disposed immediately preceding the removal system which serves to induce flow from the cabin through the system and make up for the pressure loss attendant to the air passing through the various system components.

As mentioned above, during a portion of the cycle when one of the silica gel beds and one of the crystalline zeolite beds are adsorbing, the other beds are in the reverse, desorbing process. Since silica gel affords a high capacity for adsorbing water, and since crystalline zeolite affords a high capacity for adsorbing carbon dioxide, these chemical compositions have proven to be adequate. The purpose of the silica gel is to remove substantially all the water so that air delivered to the crystalline zeolite beds will be substantially free of moisture so that the total effectiveness of the zeolite bed is utilized solely for removing carbon dioxide, thereby conserving moisture from loss overboard of the space vehicle and also preventing loss of capacity of the zeolite by its preferential loading with water. Thus, viewing the system and still referring to FIG. 1, as the air is removed from the cabin by blower 20 and assuming that silica gel bed 12 and crystalline zeolite bed 16 are adsorbing, the air flow will take the following path. Air leaving the blower and discharging into line 22 is delivered by virtue of 4-way valve 24 to the silica gel bed 12 via line 26. At this instance, the silica gel bed serves to remove the moisture as mentioned above. The substantially dry air discharging from the silica gel bed is passed through line 30, through the heater 28, and thence to 4-way valve 32. At this time, heater 28 is unenergized and does not heat the air. By virtue of the position of the 4-way valve 34, the air is delivered into the crystalline zeolite bed 16 via line 36 where the carbon dioxide is adsorbed by the zeolite. The dry residual air leaving the zeolite bed is then utilized to regenerate the other silica gel bed 14 in a manner to be described herein below. The 3-way valve 38 directs the flow to 4-way valve 32 which in turn delivers the air to heater 40. The heater is periodically energized to raise the temperature of the air entering the silica gel bed. The dry warm air then passes through the silica gel regaining humidity from the moisture adsorbed by that bed in a prior cycle. The air then leaves the silica gel bed which has reduced the temperature owing to the heat transfer between the lower temperature silica gel bed and the higher temperature air and is returned to the cabin with all of the original moisture. An advantage of this invention is that no moisture is lost overboard from the space vehicle. As pointed out above, the silica gel beds may be regeneratively cycled to adsorb and desorb at a time interval different from the time interval of the crystalline zeolite beds. This is caused by controlling the ganged 4-way valves 24 and 32 independently of the ganged 4-way valve 34 and 3-way valve 38. Thus, as the cycle through the zeolite beds remains as was described immediately above, the 4-way valves 24 and 32 may be caused to rotate to provide desorbing in silica gel bed 12 while silica gel 14 commences to adsorb.

The desorption is effected by connecting the interior of the crystalline zeolite bed to a low pressure receiver. The vacuum is provided by the outer space environment. This reduction in pressure serves to release the carbon dioxide constituent from its adsorbed condition since it affords an unbalance in the vapor pressures and the excess vapor pressure in the pores of the adsorbent causes desorption. Thus, as shown in the drawing, FIG. 1, crystalline zeolite bed 18 is in the desorbing process and the 3-way valve 38 and 4-way valve 34 isolate the bed and its associated ducting 42 and 44 from the remaining portion of the system, and valve 34 connects line 42 to the vacuum source for venting the carbon dioxide. It will be realized at this point that a certain amount of dry air trapped in the ducting and bed is also vented overboard.

In the interest of conserving the air, 3-way valve 38 is uniquely arranged in the system and sequentially operated so that instead of all the air that would heretofore be vented, only a portion is in fact vented. This is accomplished by connecting the interiors of both zeolite beds 16 and 18 with each other just prior to venting either one of the beds to the vacuum source. Half the air that is trapped in the zeolite bed that was just in the adsorbing process flows to the zeolite bed 18, which in the immediately preceding process was desorbing to vacuum. Thus, the flow continues to the bed 18 until the pressures in both beds are equal, and consequently the volume in each bed is substantially equal. During this procedure, valve 34 is in the closed position for blocking the flow and 3-way valve 38 connects line 37 with line 44.

Still referring to FIG. 1, the dry carbon dioxide free air discharging from zeolite bed 16 is ducted to heater 40 through line 37 of 3-way valve 38, line 41, 4-way valve 32 and line 43 schematically shown in the drawing. The heater, which may be omitted under some circumstances, serves to heat the discharge air just prior to the air being injected into the silica gel bed. The air serves to purge the silica gel bed so that the moisture is effectively released from the adsorption. The rehumidified air discharging from the silica gel bed is then returned to the cabin via line 50 and the 4-way valve 24. To conserve power, the heaters are intermittently operated and, for example, may operate once for every 5 times the silica gel bed has been regenerated. The heater is de-energized in sufficient time for the bed to cool before it is switched to adsorption.

Figure 6:
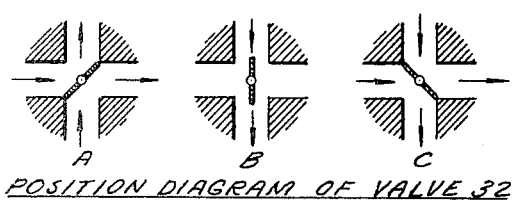
FIG. 6 is a schematic showing of the three positions of a 4-way valve.

Four-way valve 32 also serves as a bypass valve for bypassing the zeolite beds and serves to circulate flow through both silica gel beds. This is required during starting to assure that the silica gel bed is completely purged of moisture before subjecting the air to the zeolite beds. Thus, for example, during starting, valve 32 is in position B shown in FIG. 6, and the air discharging from heater 28 is delivered to heater 40 which is now energized. The warm discharging air is then passed over the silica gel bed 14 for purging the same. As soon as the silica gel bed is purged, the blower discharge air is then ducted to the purged silica gel bed. The cycle for carbon dioxide removal is then started in the manner as was described above.

As has been apparent from the foregoing, precaution for preventing moisture contamination has been adequately provided for. To further protect the zeolite beds from moisture contamination and to prevent loss of the valuable air, valves 34 and 38 are preferably sealed vacuum-tight.

Figure 2:
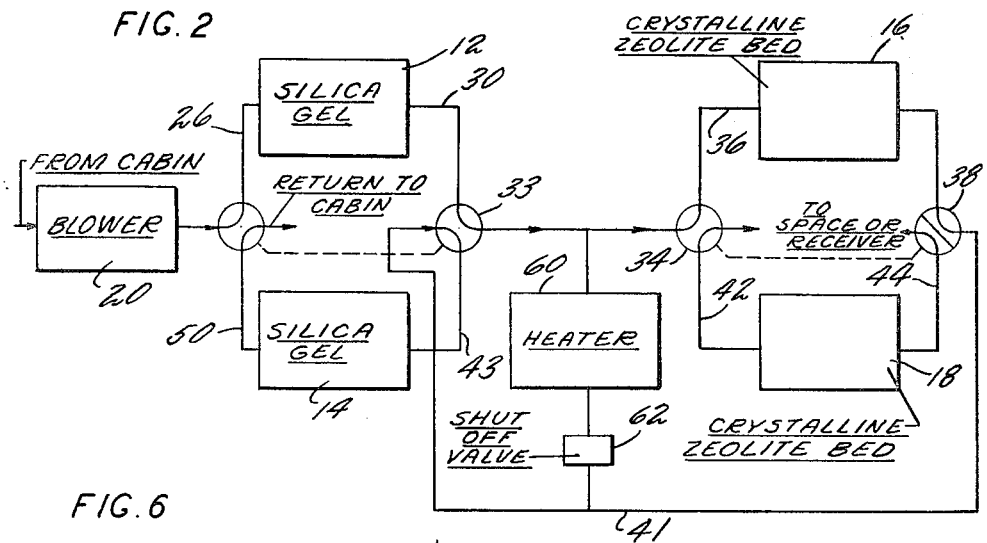
FIG. 2 is a diagrammatic illustration of the invention with two heaters removed and another added in lieu thereof.

FIG. 2 is another exemplary showing of my invention which shows a system identical to FIG. 1 except for the deletion of the two heaters and inclusion of a heater and shut-off valve between the silica gel beds and the zeolite beds. Since the operation of the system is identical to the system shown in FIG. 1, for convenience the detailed description thereof has been eliminated. Because the air discharging from the zeolite bed is at a very low dew point for certain mission requirements, the heaters may not be necessary in the purging of the silica gel beds. Thus, in FIG. 2, a heater 60 is disposed in the line bypassing the zeolite beds and only functions during the starting operation. A shut-off valve, which is normally closed, is actuated during the initial starting so that the silica gel beds would be purged before the complete system is put into operation. This is accomplished by shutting off the valves 34 and 38 and opening shut-off valve 62 so that, for example, and as schematically illustrated in the drawing, the flow will be conducted from the silica gel bed 12 through valve 32 to heater 60 and then through shut-off valve 62 back through 4-way valve 32 and delivered to the silica gel bed 14. The heater during this instance was energized for increasing the temperature of the air to effect the purging of the silica gel bed.

Figure 3:
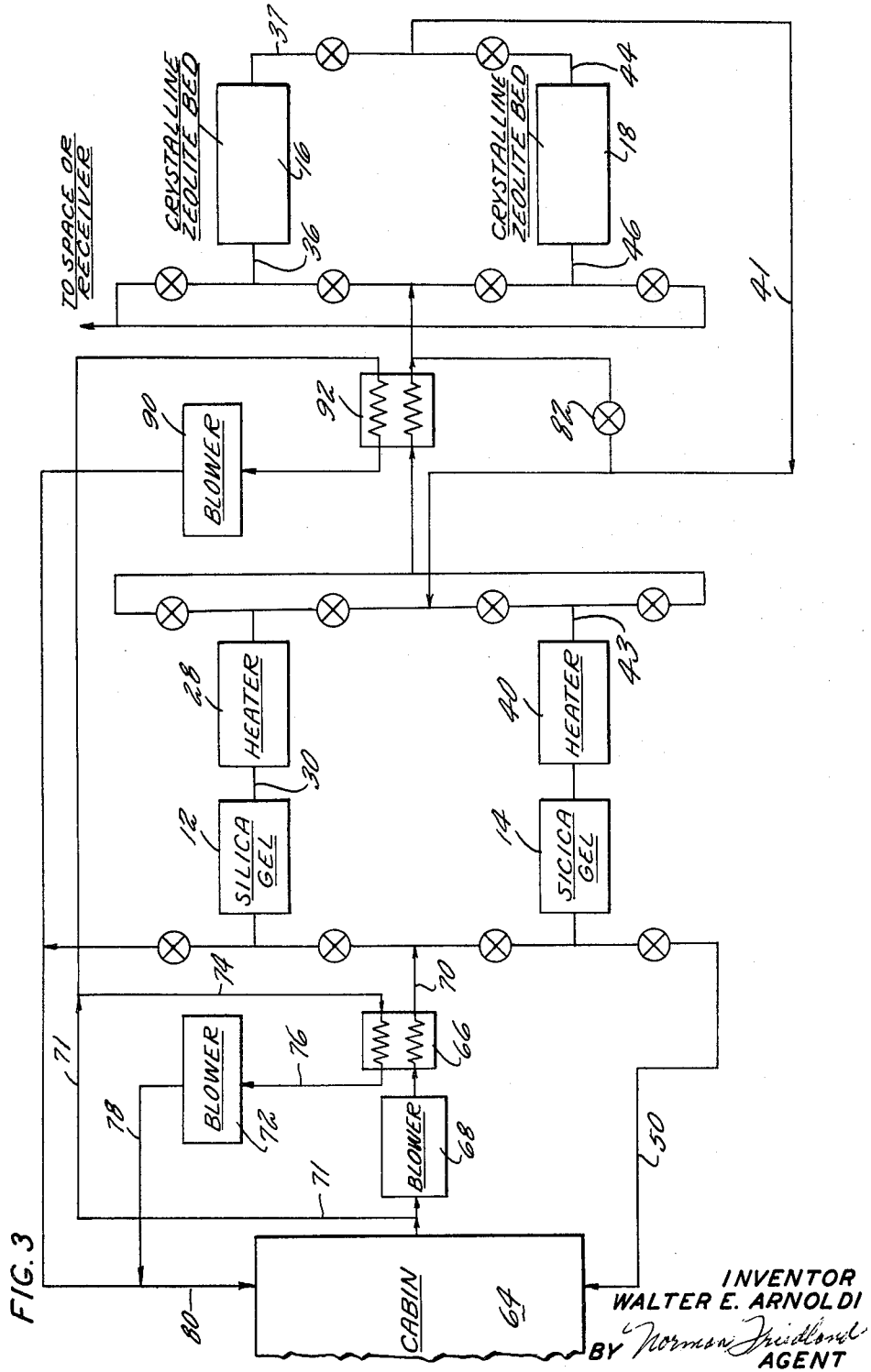
FIG. 3 is another modification of the invention employing heat exchangers.

FIG. 3 is another showing of a system similar to the systems described in FIGS. 1 and 2, and likewise a detailed description has been omitted for convenience, since the operation and elements are similar to what has been described in connection with FIGS. 1 and 2. A basic difference between these systems is that heat exchangers are provided between the blower and the silica gel beds and the heaters and the zeolite beds. Another valve arrangement is also employed where the valves may be ganged so that the cyclical regeneration of the adsorption and desorption process functions similarly to what has been described above. As shown in FIG. 3, the blower 68, which functions identically to what has been already described, delivers the air to be treated to the primary heat exchanger 66 which is in indirect heat transfer relationship with the cabin air. Since this cabin air is cooler than the air leaving the blower, the temperature of the air discharging from the heat exchanger 66 into line 70 will be reduced.

A second blower 72 is disposed between the heat exchanger 66 and cabin 64 and serves as mentioned above to cool the air to be treated. Thus, the air discharging from the cabin is induced through the heat exchanger via lines 71, 74, and 76 by blower 72 and then returned to the cabin via lines 78 and 80. The system contains 14 suitable shut-off valves which function to cyclically regenerate the silica gel beds and the Molecular Sieve in the same manner as was described in connection with FIGS. 1 and 2. Valve 82 serves as a shut-off valve and operates similarly to valve 62 described in connection with FIG. 2. Blower 90 in a like manner to blower 72 places the processed air in indirect heat transfer relation in heat exchanger 92 with the cabin discharge air cooling it prior to its entering the zeolite bed.

FIG. 4 is a modification of FIG. 3 and another exemplary showing of our invention. The primary difference between the systems is that the valves utilized in effecting regeneration in FIG. 3 have been replaced by 4-way and 3-way valves in FIG. 4. FIG. 4 also serves as an example for indicating the temperature, pressures, and flow characteristics of the air.

In the arrangement of FIG. 5 which is still another exemplary showing of this invention, the blower has been located in a different position as was noted in the other drawing. The operation of this scheme is substantially similar to what has been described above and being another basic schematic diagrammatic illustration of a carbon dioxide separation system. Where available, cold air is bled from the cabin heat rejection system and passed through a silica gel bed for dehumidification. The dry air is then cooled by two heat exchangers, first a regenerative heat exchanger 100 to recover heat of adsorption and stored heat from the previous silica gel purge, and second, a cooling heat exchanger 102 to maintain minimum temperature during carbon dioxide adsorption. Cool, dry air is then passed through one of two Molecular Sieve beds for carbon dioxide adsorption, the other being simultaneously desorbed by evacuation to space. From the adsorbing bed the processed air is returned to the regenerative heat exchanger for economy in heating, thence through a fan 104 which compensates for pressure drops throughout the system and adds its own energy to cause a temperature rise in the air. Next, it passes through an electric heater which brings the air temperature up, for example, to 250° F. for purging of the second silica gel bed. The purging of this bed rehumidifies the air, which then returns to the cabin. Purging of the second silica gel bed is accomplished in the same period used for adsorption in the first bed, whereupon these functions are interchanged by means of control valves in order to maintain continuous air drying and rehumidification through cycling of the silica gel. It should be noted that, although water vapor is cyclically stored and released, no net humidity control is provided by this system. Excess moisture removal must be accomplished by other means.

Essentially pure carbon dioxide is dumped overboard by cyclic evacuation of the Molecular Sieve beds, carrying with it only the small amount of cabin air trapped in the residual volume of the adsorbent canisters, ducts, and valves.

This invention takes advantage of two unique opportunities for the space vehicle adsorption system which are not normally exploited in industrial applications of solid adsorbents. With respect to the Molecular Sieve canisters, note that desorption is accomplished by evacuation without heating. Because of the low weight loading of carbon dioxide due to adsorption at a low partial pressure, together with the relatively low heat of desorption, there is adequate heat available from the mass of zeolite to permit desorption without supplying additional energy. It has been verified experimentally that desorption by evacuation alone is effective and that the rate of desorption is determined primarily by the rate of flow out of the canister to vacuum. However, since the carbon dioxide loading of crystalline zeolite at low partial pressure is roughly proportional to the square root of the pressure, effective desorption requires lowering the pressure to the vicinity of 100 microns of mercury or better, and the gas volumes which must be discharged overboard are correspondingly large. Minimum pressure drops through the canisters, valves, and ducts during desorption thus become engineering requirements.

From the foregoing arrangements, it is apparent that the systems have been uniquely arranged to provide efficient carbon dioxide removal and yet require a minimum power consumption. Other advantages accomplished by these arrangements are: the minimization of heat loss and consequently power requirements by shuttling heat between two regenerators (as shown in FIG. 5); the minimization of power requirements for purging by using two separate adsorbent beds, one for water adsorption and the other for carbon dioxide adsorption; provision of a lightweight and low power consuming carbon dioxide removal system for long mission duration applications (this is accomplished as a result of the unique regeneration characteristics of the system); the elimination of problems resulting from the absence of motion and gravity forces, such as those that would be encountered in a liquid absorption system; the recovery of water adsorbed during the carbon dioxide removal process for use in the cabin; and the recouping of energy expended by virtue of extracting moisture utilizing the adsorbent effluent air for purging the silica gel beds.

It is to be understood that the invention is not limited to the specific embodiment herein illustrated and described, but may be used in other ways without departure from its spirit as defined by the following claims.

I claim:

1. Apparatus for removing carbon dioxide from air contained in a sealed compartment and for returning the carbon dioxide free air back to said compartment comprising, in combination, a sealed compartment, a pair of carbon dioxide adsorbent beds and a pair of water adsorbent beds, connection means for directing the flow of carbon dioxide contaminated air through one of said pair of water adsorbent beds and then to one of said pair of carbon dioxide beds, first regenerating means including passages for directing the total flow of carbon dioxide free air from the discharge end of said one of said pair of carbon dioxide adsorbent beds to the other of said pair of water adsorbent beds and back to said compartment, second regenerating means including a source of low pressure, additional passage means connecting the other of said pair of carbon dioxide adsorbent beds to said source, and means for interconnecting one of said pair of carbon dioxide adsorbent beds with the other of said pair of carbon dioxide adsorbent beds prior to regenerating either of said pair of carbon dioxide adsorbent beds.

2. Apparatus for removing carbon dioxide from air contained in a compartment and returning the carbon dioxide free air back to the compartment comprising a compartment, a pair of water adsorbent beds and a pair of carbon dioxide adsorbent beds, means for inducing the flow of carbon dioxide contaminated air alternately through either one of said pair of water adsorbent beds from the inlets to the outlets of said beds, and then to one of said pair of said carbon dioxide adsorbent beds from the inlets to the outlets of said beds, means for alternately connecting the outlets of either one of said pair of carbon dioxide adsorbent beds to the outlets of either one of said pair of water adsorbent beds and said compartment for backflow through the water adsorbent beds, first regenerating means for regenerating said pair of carbon dioxide beds, said first regenerating means including a source of low pressure, connection means alternately interconnecting said source and one of said pair of carbon dioxide adsorbent beds, second regenerating means for regenerating said pair of water adsorbent beds, said second regenerating means including connection means for alternately connecting one of said pair of carbon dioxide adsorbent beds to one of said pair of water adsorbent beds when said one of said pair of carbon dioxide adsorbent beds is connected to said source, in combination with means for preventing a portion of the air trapped in one of said pair of carbon dioxide adsorbent beds from discharging to said source, said means including conduit means connected from the interior of one of said pair of carbon dioxide adsorbent beds to the interior of the other of said pair of carbon dioxide beds, and valve means disposed in said conduit means for interconnecting said pair of carbon dioxide adsorbent beds just prior to the regeneration of either one of said pair of carbon dioxide adsorbent beds.

3. Apparatus for removing carbon dioxide from air contained in a sealed compartment and for returning the carbon dioxide free air back to said compartment, said apparatus having a sealed compartment, a first water adsorbent bed, a second water adsorbent bed, a first carbon dioxide adsorbent bed and a second carbon dioxide adsorbent bed, passage means alternately interconnecting said first water adsorbent bed to said first carbon dioxide bed and said second water adsorbent bed, said passage means also alternately interconnecting said second water adsorbent bed with said first carbon dioxide adsorbent bed and said second carbon dioxide adsorbent bed, means for inducing flow of carbon dioxide contaminated air through said passage means, means for regenerating said first and second water adsorbent beds by alternately passing air discharging from said first and second carbon dioxide beds alternately through said first and second water adsorbent beds, means including valve means movable in three positions for regenerating said first and second carbon dioxide adsorbers, a source of low pressure, said valve means sequentially operable for interconnecting said first carbon dioxide adsorbent bed and said first or second water adsorbent beds when said valve means is interconnecting said second carbon dioxide adsorbent bed and said source, interconnecting said first and second carbon dioxide adsorbent beds when said valve means is disconnecting said first and second carbon dioxide beds and said source, and interconnecting said second carbon dioxide adsorbent bed and said first or second water adsorbent beds when said valve means is interconnecting said first carbon dioxide adsorbent bed and said source, and connection means alternately interconnecting said first and second water adsorbent beds with the compartment when the respective water adsorbent bed is being regenerated.

References Cited by the Examiner
UNITED STATES PATENTS

| | | | |
|---|---|---|---|
| 1,948,779 | 2/1934 | Abbott et al. | 55—31 |
| 2,588,296 | 3/1952 | Russell | 55—33 X |
| 2,893,512 | 7/1959 | Armond | 55—58 |
| 2,899,474 | 8/1959 | Ricards | 55—76 X |
| 2,944,627 | 7/1960 | Skarstrom | 55—33 X |
| 2,992,703 | 7/1961 | Vasan et al. | 55—62 |
| 3,102,013 | 8/1963 | Skarstrom | 55—76 X |

REUBEN FRIEDMAN, *Primary Examiner.*

HERBERT L. MARTIN, *Assistant Examiner.*